United States Patent [19]

Fritsch

[11] 4,108,588

[45] Aug. 22, 1978

[54] APPARATUS FOR PROCESSING MOLTEN LIQUID PLASTICS, PARTICULARLY FOR EXTRUSION OF PLASTICS

[75] Inventor: Rudolph Paul Fritsch, Stuttgart, Fed. Rep. of Germany

[73] Assignee: C.F. Scheer & Cie., Stuttgart, Fed. Rep. of Germany

[21] Appl. No.: 793,727

[22] Filed: May 4, 1977

Related U.S. Application Data

[62] Division of Ser. No. 612,467, Sep. 11, 1975, Pat. No. 4,066,097.

[51] Int. Cl.² .............................................. B29F 3/00
[52] U.S. Cl. .................................. 425/185; 210/447; 425/190; 425/217
[58] Field of Search .................... 425/192 S, 182, 183, 425/185, 186, 197, 217, 190; 210/340, 341, 447, 510

[56] References Cited

U.S. PATENT DOCUMENTS

| | | | |
|---|---|---|---|
| 3,167,811 | 2/1965 | Kraus et al. | 425/217 |
| 3,501,806 | 3/1970 | Schrader | 425/185 |
| 3,503,096 | 3/1970 | Marianelli | 425/190 X |
| 3,589,163 | 6/1971 | Byrne et al. | 425/185 X |
| 3,743,101 | 7/1973 | Schmidt | 210/447 |
| 3,947,195 | 3/1976 | Fritsch | 425/190 |

FOREIGN PATENT DOCUMENTS 1,312,696  11/1962  France ..................... 425/217

*Primary Examiner*—Francis S. Husar
*Assistant Examiner*—William R. Briggs
*Attorney, Agent, or Firm*—Olsen and Stephenson

[57] ABSTRACT

Apparatus for forming plastic melts into strands or filaments wherein molten plastic material is delivered by a pump from a container through a feed line to a distributor means which has a first outlet for the molten plastic material to be processed and a second outlet to a return line leading back to the container, and a control valve is located in the return line to regulate the return of flow of the plastic material to the container, the return flow of the plastic material to the container, the return line and associated control functioning to avoid undesirable plugging of the apparatus or damage to the plastic materials during interruptions in operations, and the like.

4 Claims, 2 Drawing Figures

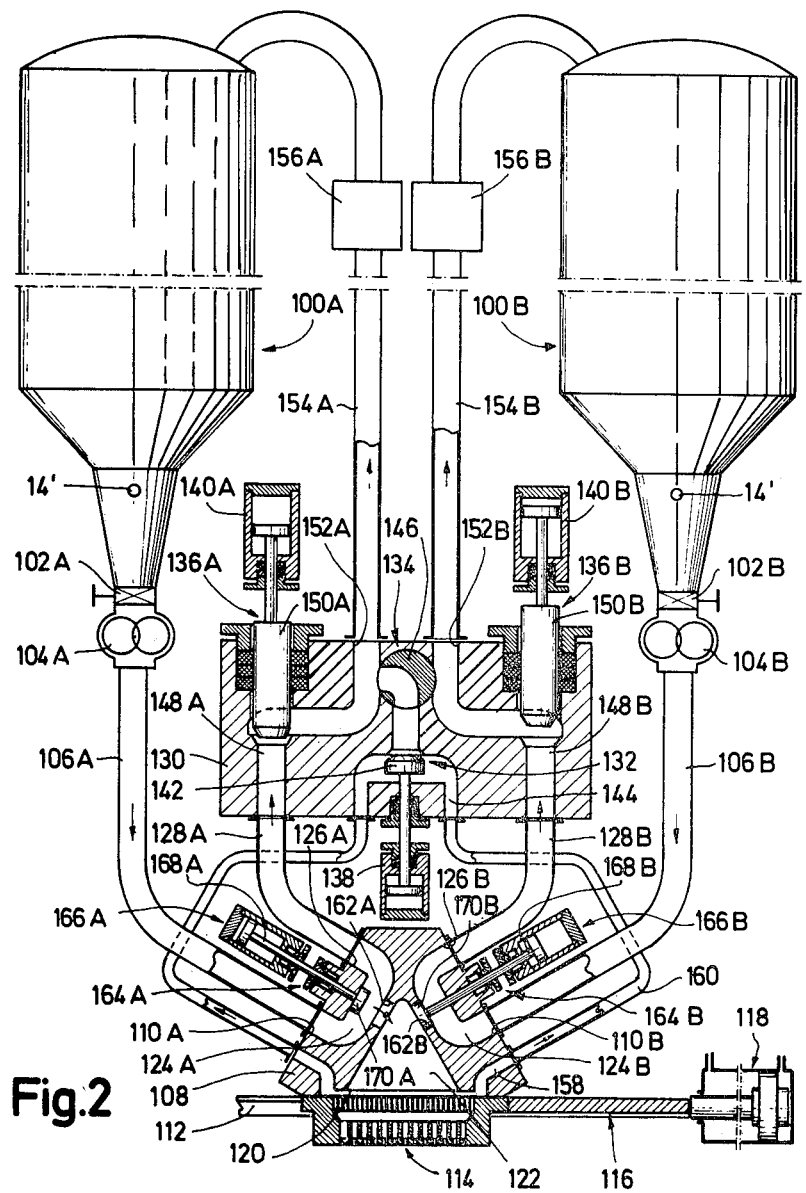

APPARATUS FOR PROCESSING MOLTEN LIQUID PLASTICS, PARTICULARLY FOR EXTRUSION OF PLASTICS

REFERENCE TO RELATED APPLICATION

This is a division of application Ser. No. 612,467, filed Sept. 11, 1975 now U.S. Pat. No. 4,566,097.

BACKGROUND OF THE INVENTION

The invention concerns an apparatus for the processing of plastic melts, and particularly for the extrusion of plastics, said apparatus comprising at least one feed line which by means of a pump is connected to a vessel containing the yet be processed plastic melts, a housing having a first outlet for the molten plastic to be processed as well as a second outlet for the connecting of a return line leading back to the vessel, and at least one valve for the control of the return flow of the liquid plastic to the vessel. Such an apparatus is described in a prior filed application Ser. No. 493,276 now U.S. Pat. No. 3,947,195 of the same applicant.

Devices for the production of plastic granulates, plastic fibers, etc., often contain a polymerization vessel to which a pump is connected which forces the molten liquid plastic into a die head, from which then emerge the plastic strands, fibers, etc. The polymerization process usually requires several hours, during which time the product is constantly stirred. If only one such vessel is used, the plastic is further processed in batches. During the entire preparation or polymerization time not only the vessel must be continually heated, but also all parts of the apparatus between the vessel and the die head, so as to prevent that the plastic remaining from the previously processed batch does not set up in these components, thereby rendering the apparatus unusable. Many plastic materials, however, are temperature sensitive and would be thermically damaged were they to be kept for long time periods inside the hot pipe conduits and bores between the vessel and the die head considerable waste would result. The same is the case when the process has to be interrupted because a filter for the plastic melt arranged ahead of the die head or build inside it has to be cleaned.

In order to lessen the danger of thermic damage to a certain part of each batch, a device of the above mentioned type has already been suggested (Ser. No. 493,276). In it, upstream of the die head, a three-way valve is arranged, its inlet port connected to a bore or pipe guiding the plastic material to be processed to the die head, and its second outlet part connected to a return line. The liquid plastic fed into the inlet to the apparatus may thus either be processed, or be recirculated into the container. While it is possible in this manner to reduce the quantity of possibly thermically damaged plastic material drastically, such solution can nevertheless not prevent thermal damage when during the switch-over of the three-way valve to back-flow of the plastic material to the container, for example during the change-out of a die head, some plastic material is allowed to remain inside the heated pipes and bores between the three-way valve and the die head for relatively long periods of time. It is precisely this very plastic material which upon resumption of processing is forced through the die first.

SUMMARY OF THE INVENTION

The object of the invention is to improve an apparatus of the above discussed type so that during an interruption of the processing phase, or during a switch over from a first to a second batch of molten plastics, the apparatus is alsways completely flushed, thereby not allowing any plastic materials, even in small quantities, to remain within the heated components of the apparatus — except the vessels — for prolonged periods of time. Instances of thermical damage to the plastic materials are thereby reduced.

The object of the invention is realized by constructing the device of the above discussed type such that the first outlet is closable by means of a closing member, and that a flushing line terminates in the housing upstream of this closing member and in its immediate vicinity, which flushing line can be connected to the second outlet of the apparatus by means of the valve. If in the apparatus according to the invention the processing of the plastic material to a granulate, foil, etc. is for some reason interrupted; plastic material is nevertheless continuously pumped out of the vessel to the first outlet (processing outlet). From there the pressure of the following plastic material forces it back into the container via the flushing line, the valve, the second outlet, and the return line. The closing of the first outlet furthermore has the advantage that no plastic material can leak from the apparatus for example during the change of a die head or a filter arranged upstream thereof or inside it.

Of course, the flushing line may also be designed to have such a small cross sectional area that the plastic volume maximally flowing therethrough can be easily branched off, even during the processing phase, to be pumped back to the vessel, so that the valve for controlling the return flow would be superfluous. In such an embodiment of the inventive apparatus the disadvantage, however, would be that during an interruption of the processing phase the pump would have to work against rapidly rising pressure because of the small cross sectional area.

If one completely closes the valve for the control of the back flow during normal processing of the plastic material, the plastic melt would become stationary inside the flushing line, thus to be subjected to the danger of thermal damage. In order to prevent such, and additionally in order to prevent that during the normal processing of the plastic material exceedingly large volumes are pumped back via the flushing line into the vessel, requiring an unnecessarily high pump output, it is furthermore recommended to construct the valve for the control of the back flow in such a manner that in addition to its first position of maximal opening for a maximal return flow via the flushing line at least one secondary position of lesser opening is available, the valve still, however, not being completely closed. By means of the slightly open valve during normal processing a sufficient plastic stream can back-flow through the flushing line, while otherwise, when the valve is completely open, a relatively large plastic material valumes can be pumped back. Thus, no undesirably large pressure can build up on the discharge side of the pump when the closing member is closed.

In a preferred embodiment of the inventive apparatus the closing member is a plate slidably attached to or within the housing and immediately adjacent to the die head. Several flushing lines are connected upstream of this plate alongside the edge of the first outlet. The plate therefore can take the place of a filter or of a die head with an integral filter, having the advantage that indeed the entire apparatus is flushed up to the components to be exchanged. Furthermore, by the multitude of flushing lines no dead zones can form, even in the area of the plate, in which the molten plastic material can remain for an undesirably long period of time.

The above indicates that this variation of the invention is particularly suitable for combination with an exchangeable die head in which the filter is integrally installed; during the exchange of such so called die-filter the plate need merely be installed in its place. Such a die-filter has already been suggested by the applicant in his patent application Ser. No. 493,261.

It is desirable for several reasons not to have to follow each container, for example each polymerization vessel, with its own processing apparatus, as such is not only extremely expensive, but also requires that at each conclusion of the processing phase of a batch the entire process is interrupted. The connection of several vessels to one singular processing apparatus had the disadvantage, however, of the required long pipe sections, all of which must be heated so that the plastic in those lines which lead to not then operational vessels are subjected to the danger of thermal damage. The inventive concept here suggests to provide the inventive apparatus with several inlets to be connected to outlets of several vessels containing the molten plastic material to be processed; further, several second outlets should be provided connecting to the back-flow lines of the vessels, as well as a multiple way valve for the selective connecting of the flushing line with one of the back flow lines. Additionally, for each inlet a switch valve should be provided in order to distribute the flow either to the first outlet (processing outlet) or to the second outlet associated with this inlet. It is thus possible to operate continuously. Plastic material is continually pumped even from vessels not then connected to the processing outlet through the switch valve and associated back-flow line back into the vessel, thereby constantly flushing all lines and ports. The switch valve is preferably built such that it opens in its every position the connection between the switch valve and the associated second outlet, so that this duct is flushed even when the plastic material from the associated container is just being processed. In order on the other hand to prevent that too much plastic material flows back into the container via this channel during the normal processing, it is recommended to provide upstream of the multiple way valve a choke valve between each switch valve and associated second outlet such choke valve to be adjustable at least from an open position to a choke position in which it is not quite closed. Thereby it is guaranteed that sufficient quantities of plastic material flow through the duct between the switch valve and the second outlet in order to continuously flush it, even when the vessel is connected to the processing outlet.

Finally it is recommended to provide a filtering mechanism in the return line, so that the plastic material is continuously filtered, but without interrupting the back flow during a screen change. Filtering devices of that type are known from German published patent application No. 1,729,193.

Further characteristics advantages and details of the invention are contained in the attached claims and/or the drawings and/or the following description of the preferred embodiments of the inventive apparatuses represented in the drawings; there is shown in:

FIG. 1 is a schematical representation of an apparatus with the inventive apparatus connected only to one singular vessel; and FIG. 2 a schematical representation of another embodiment of the inventive apparatus in which it is connected to two containers.

DESCRIPTION OF THE PREFERRED EMBODIMENTS

Figure 1:
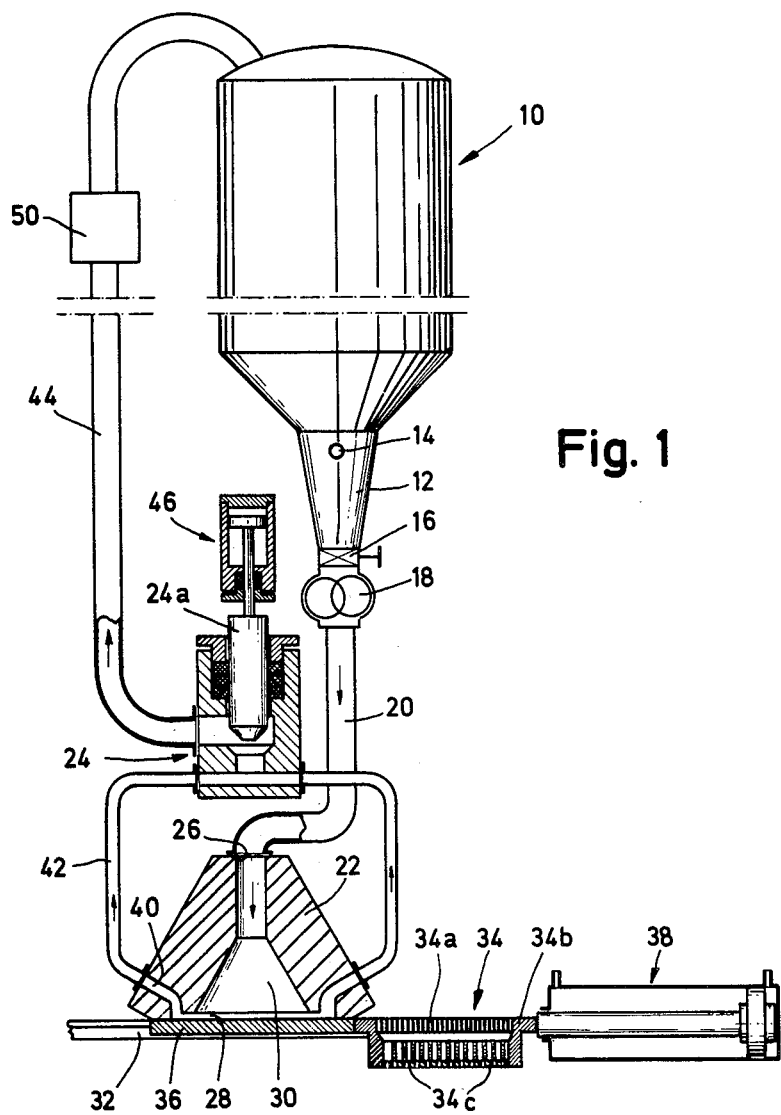

FIG. 1 shows a polymerization vessel 10, onto which lower end is connected a nipple 12 forming an outlet, and which additionally is provided with a measuring device 14 to monitor the level of the plastic melt within the polymerization vessel. An outlet valve 16 and a melt pump 18 are connected to nipple 12.

The pump transfers the plastic melt through feed line 20 into the inventive apparatus. Said apparatus basically consists of a housing 22 and a choke valve designated as a whole by 24. Housing 22 contains an inlet 26 to which is connected feed-line 20, as well as main supplyline 30, widening in the direction of outlet 28. At the lower side of housing 22 guide rails 32 are installed onto which components to be slid in front of outlet 28 are positioned. FIG. 1 further shows a so called die-filter, indicated as a whole by 34, as well as a closing plate 36; said figure further reveals that the die-filter consists of a filter plate 34a and a die body 34b containing bores 34c for the pressing out of plastic strands. Die-filter 34 may just as well be, for example, a wide slit die for the extrusion of foils. For the movement of closing plate 36 and die-filter 34 on the guide rails 32 a hydraulic cylinder 38 is provided.

Several flushing ports 40 ending immediately at outlet 28 are machined into housing 22. Outlet pipes 42 lead from the other end of the flushing parts to choke valve 24, which in turn is connected with the polymerization vessel 10 via back flow line 44. A valve member 24a of choke valve 24 is adjustable by means of a further hydraulic cylinder 46 between a first position indicated in FIG. 1, in which the choke valve 24 is entirely opened, and an advanced second position, in which the choke valve has a drastically reduced throughput cross sectional area, but is not completely closed.

Finally, in the path of back-flow line 44 a filter indicated as a whole as 50 is provided which serves to filter the liquid plastic material prior to again reaching the polymerization vessel 10.

The entire polymerization vessel 10 as well as all lines, bores, and ports of the apparatus shown in FIG. 1 are continuously heated, for example electrically or by means of hot medium circulation, in order to always maintain the plastic material to be processed through the apparatus in liquid form. The die filters are of course heated in similar fashion. Since the invention is, however, not concerned with the heating, the therefor required components have been omitted in the drawing.

If in the apparatus shown die filter 34 is to be changed because there had been too much deposition on its filter plate 34a, the die filter to be exchanged is pushed away from under the housing 22 by means of the hydraulic cylinder 38, and in its place the closing plate 36 is emplaced over the outlet 28. At the same time choke valve 24 is opened (to the position indicated in FIG. 1) so that pump 18 may continue pumping at full capacity, since then the plastic material pumped into housing 22 can flow back into the polymerization vessel 10 via flushing ports 40, outlet pipes 42, choke valve 24, back-flow line 44, and filter 50. Such measure not only prevents the pump 18 is forced to pump against too high a pressure, but moreover it is achieved that the movement of plastic melt has not stopped in any part of the apparatus. Thus, there is no danger of thermal damage to the plastic material. The flushing ports 40 ending immediately above closing plate 36 are intended above all to insure that no dead zones exist in the melt circulation system, even in the area of outlet 28, i.e. the processing outlet.

To clean die filter 34 or to replace it with a cleaned die filter, hydraulic cylinder 38 moves a new die filter in place of closing plate 36 and thereby across outlet 28 of housing 22. At the same time, hydraulic cylinder 46 almost but not quite closes choke valve 24, so that even during the processing of the plastic material plastic melt continues to circulate through the flushing ports 40, outlet pipes 42, choke valve 24, and back-flow line 44, thereby preventing any thermal damage to the plastic material.

Measuring device 14 may also initiate the closing of outlet 28 with closing plate 36 when the plastic material batch contained in the polymerization vessel is nearly processed. Then the remainder of the plastic material circulates within the apparatus until a new batch is in the polymerization vessel ready for processing. The measuring device 14 thus can be used to control hydraulic cylinders 38 and 46.

Precisely when the inventive apparatus is combined with a so called die-filter, as is taught in U.S. Pat. No. 3,947,202, no dead areas can exist within the circulatory system in any part of the entire apparatus. The continuous circulation of the plastic melt through all components of the apparatus brings the substantial advantage that the processing apparatus need not be attached immediately onto the vessel holding the plastic melt, since the length of the pipe connections, not considering the heating factor, is not longer material. Therefore, the invention also makes possible the installation of vessels at relatively great height above the processing apparatus itself, a measure which had always been desirable but had until now not been practicable.

The embodiment represented in FIG. 2 combines the advantages of the embodiment of FIG. 1 with the possibility of connecting several vessels containing plastic melt with a singular processing apparatus, thereby obviating the necessity of having a processing apparatus for each and every reactor vessel.

Two polymerization vessels 100a, 100b are connected via an outlet valve 102a, 102b and melt pump 104a, 104b as well as feed line 106a, 106b to a housing 108, and specifically to first inlets 110a, 110b. Housing 108 also is provided with guide rails 112 for a die-filter 114 and a closing plate 116, which by means of hydraulic cylinder 118 may be slid over outlet 120 of housing 108. This outlet forms the opening to chamber 122 within housing 108.

From inlets 110a, 110b approximately U-shaped bores 124a, 124b within housing 108 lead to outlets 126a, 126b, which by means of return lines 128a, 128b are connected to valve block 130. Said valve block comprises several valves, namely choke valve 132, a multiple-way valve 134, as well as two choke valves 136a, 136b. To activate the choke valves hydraulic cylinders 138 as well as 140a and 140b are provided; the control mechanism for the multiple-way valve 134 has been omitted from the drawing for simplicity sake. By means of valve member 142 of choke valve 132 port 144 within valve block 130, which branches toward the bottom, may be entirely opened or nearly closed (position of valve member 142 indicated in FIG. 2); the rotatable valve member 146 of the multiple valve 134 serves to selectively connect the upper end of port 144 with either port 148a or port 148b within valve block 130. Finally these ports by means of valve members 150a, 150b of choke valve 136a, 136b may either be completely opened or nearly closed.

Valve block 130 with the upper portions of ports 148a, 148b form two outlets 152a, 152b, which by way of back-flow lines 154a and 154b are connected with the polymerization vessels 100a and 100b, respectively. Again each back-flow line is provided with filter 156a, 156b, corresponding to filter 50 in the apparatus of FIG. 1.

Flushing ports 158 terminate around outlet 120, the processing outlet of housing 108; the other end of said flushing ports are connected by means of pipes 160 to the branches of port 144 within valve block 130. Additionally the U-shaped bores 124a, 124b of housing 108 are connected with chamber 122 via passages 162a and 162b, which may be closed by means of diversion valves 164a and 164b. These diversion valves each have a hydraulic cylinder 166a, 166b, and a piston rod 168a, 168b, to which valve members 170a, 170b are attached so as to be capable of closing the respective passages 162a, 162b. The valve members are formed so that in their retracted position openings 162a and 162b remain open, while in their advanced, effective position bores 124a and 124b remain open.

Of course in this embodiment as well all components of the apparatus are heatable, so that the plastic material is maintained in a liquid state in all components.

The functioning of the apparatus shown in FIG. 2 is as follows:

The Figure indicates a condition in which plastic melt from polymerization vessel 100a is processed. Therefore diversion valve 164a opens passage 162a within housing 108, while diversion valve 164b closes the passage 162b. Since die filter 114 is located beneath outlet 120 of housing 108, choke valve 132 takes up its choke position in which the valve member 142 almost closes port 144. Choke valve 136a is also nearly closed, while choke valve 136b is in open position, i.e. valve member 150b is withdrawn toward the upside out of port 148b. Pump 104a thus transports the main quantity of plastic through passage 162a and the die filter 114. At the same time while small amounts of plastic material flow via flushing port 158, the nearly closed choke valve 132, and multiple-way valve 134 in its indicated position into back-flow line 154a; other portions return to back-flow line 154a through return line 128a, port 148a and the nearly closed choke valve 136a.

Pump 104b nearly circulates the plastic material from polymerization container 100b since diversion valve 164b closes passage 162b. The entire amount of plastic material transported by pump 104b flows through U-shaped bore 124b, return line 128b, and port 148, then passes through opened choke valve 136b into back flow line 154b.

When the batch within polymerization vessel 100a is nearly processed, diversion valve 164a is closed, diversion valve 164b is opened, multiple way valve 134 is positioned such that it connects the upper end of port 144 with port 148b, choke valve 136a is entirely opened, and choke valve 136b is nearly closed. The flow scheme then is a mere mirror image of the previously described process.

If it is desired to exchange die filter 114, for example for purposes of cleaning, closing plate 116 is pushed across outlet 120 by means of hydraulic cylinder 118. In this condition as well, and irrespective of the position of diversion valves 164a and 164b plastic melt is circulated through all lines, ports, and passages of the entire apparatus. Pumps 104a and 104b need not even work against rising pressure since simultaneous with the installation of closing plate 116, choke valve 132 is entirely opened, so that it completely exposes port 144 (closing member 142b is withdrawn into a lower end position).

Here also, the control of the valves may be achieved by means of the measuring apparatus 14' corresponding to measuring apparatus 14 in FIG. 1.

I claim:

1. Apparatus for forming plastic melts into strands or filaments, comprising distributing means; delivery means to deliver plastic melt from a container to said distributing means; said distributing means including a chamber, an inlet in communication with said delivery means and said chamber to receive a plastic melt feed stream from said container for flow into said chamber, said chamber having a first outlet opening for the plastic melt to be formed, a closing member and an interchangeable member, said first outlet opening being closable with said closing member and being adapted to be in juxtaposition with one face of said interchangeable member, said one face having a plurality of openings for passage of the plastic melt to be formed, guide means mounted to guide said closing member and said interchangeable member for sliding movement parallel to the plane of said first outlet opening and to positions juxtaposed with respect to said first outlet opening; said distributing means further including a back-flow line and valving means, and a second outlet communicating with said container via said back-flow line and said valving means for controlling the back-flow of the plastic melt to the container; and flushing means including a flow passageway communicating with said chamber at a point upstream of said first outlet opening, and in the immediate vicinity thereof, said passageway being connected with said second outlet via said valving means.

2. Apparatus of claim 1 in which said valving means comprises a valve with a first position of maximal opening for maximal back-flow through said flushing means, and at least a second position of lesser opening, in which the valve remains slightly open.

3. Apparatus of claim 1, in which said closing member comprises a plate slidably attached to said distributing means.

4. Apparatus of claim 1, in which a plurality of flushing passageways terminate upstream of said closing member immediately adjacent to and alongside the edge of said first outlet opening.

* * * * *

UNITED STATES PATENT OFFICE
CERTIFICATE OF CORRECTION

Patent No. 4,108,588  Dated August 22, 1978

Inventor(s) Rudolph Paul Fritsch

It is certified that error appears in the above-identified patent and that said Letters Patent are hereby corrected as shown below:

Column 1, line 8, "4,566,097" should be --4,066,097--.
Column 2, line 7, "alsways" should be --always--.
Column 5, line 3, "the" should be --that--.

Signed and Sealed this

Fifteenth Day of May 1979

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Page 1 of 2

Patent No. 4,108,588　　　　　　　　　Dated August 22, 1978

Inventor(s) Rudolph Paul Fritsch

It is certified that error appears in the above-identified patent and that said Letters Patent are hereby corrected as shown below:

The attached Columns 1 thru 4 should be inserted as first page of the specification.

This Certificate of Correction applys to the Grant, exclusively.

Signed and Sealed this

Eighteenth Day of September 1979

[SEAL]

Attest:

LUTRELLE F. PARKER
*Attesting Officer*　　　*Acting Commissioner of Patents and Trademarks*

APPARATUS FOR PROCESSING MOLTEN LIQUID PLASTICS, PARTICULARLY FOR EXTRUSION OF PLASTICS

REFERENCE TO RELATED APPLICATION

This is a division of application Ser. No. 612,467, filed Sept. 11, 1975 now U.S. Pat. No. 4,566,097.

BACKGROUND OF THE INVENTION

The invention concerns an apparatus for the processing of plastic melts, and particularly for the extrusion of plastics, said apparatus comprising at least one feed line which by means of a pump is connected to a vessel containing the yet be processed plastic melts, a housing having a first outlet for the molten plastic to be processed as well as a second outlet for the connecting of a return line leading back to the vessel, and at least one valve for the control of the return flow of the liquid plastic to the vessel. Such an apparatus is described in a prior filed application Ser. No. 493,276 now U.S. Pat. No. 3,947,195 of the same applicant.

Devices for the production of plastic granulates, plastic fibers, etc., often contain a polymerization vessel to which a pump is connected which forces the molten liquid plastic into a die head, from which then emerge the plastic strands, fibers, etc. The polymerization process usually requires several hours, during which time the product is constantly stirred. If only one such vessel is used, the plastic is further processed in batches. During the entire preparation or polymerization time not only the vessel must be continually heated, but also all parts of the apparatus between the vessel and the die head, so as to prevent that the plastic remaining from the previously processed batch does not set up in these components, thereby rendering the apparatus unusable. Many plastic materials, however, are temperature sensitive and would be thermically damaged were they to be kept for long time periods inside the hot pipe conduits and bores between the vessel and the die head considerable waste would result. The same is the case when the process has to be interrupted because a filter for the plastic melt arranged ahead of the die head or build inside it has to be cleaned.

In order to lessen the danger of thermic damage to a certain part of each batch, a device of the above mentioned type has already been suggested (Ser. No. 493,276). In it, upstream of the die head, a three-way valve is arranged, its inlet port connected to a bore or pipe guiding the plastic material to be processed to the die head, and its second outlet part connected to a return line. The liquid plastic fed into the inlet to the apparatus may thus either be processed, or be recirculated into the container. While it is possible in this manner to reduce the quantity of possibly thermically damaged plastic material drastically, such solution can nevertheless not prevent thermal damage when during the switch-over of the three-way valve to back-flow of the plastic material to the container, for example during the change-out of a die head, some plastic material is allowed to remain inside the heated pipes and bores between the three-way valve and the die head for relatively long periods of time. It is precisely this very plastic material which upon resumption of processing is forced through the die first.

SUMMARY OF THE INVENTION

The object of the invention is to improve an apparatus of the above discussed type so that during an interruption of the processing phase, or during a switch over from a first to a second batch of molten plastics, the apparatus is alsways completely flushed, thereby not allowing any plastic materials, even in small quantities, to remain within the heated components of the apparatus — except the vessels — for prolonged periods of time. Instances of thermical damage to the plastic materials are thereby reduced.

The object of the invention is realized by constructing the device of the above discussed type such that the first outlet is closable by means of a closing member, and that a flushing line terminates in the housing upstream of this closing member and in its immediate vicinity, which flushing line can be connected to the second outlet of the apparatus by means of the valve. If in the apparatus according to the invention the processing of the plastic material to a granulate, foil, etc. is for some reason interrupted; plastic material is nevertheless continuously pumped out of the vessel to the first outlet (processing outlet). From there the pressure of the following plastic material forces it back into the container via the flushing line, the valve, the second outlet, and the return line. The closing of the first outlet furthermore has the advantage that no plastic material can leak from the apparatus for example during the change of a die head or a filter arranged upstream thereof or inside it.

Of course, the flushing line may also be designed to have such a small cross sectional area that the plastic volume maximally flowing therethrough can be easily branched off, even during the processing phase, to be pumped back to the vessel, so that the valve for controlling the return flow would be superfluous. In such an embodiment of the inventive apparatus the disadvantage, however, would be that during an interruption of the processing phase the pump would have to work against rapidly rising pressure because of the small cross sectional area.

If one completely closes the valve for the control of the back flow during normal processing of the plastic material, the plastic melt would become stationary inside the flushing line, thus to be subjected to the danger of thermal damage. In order to prevent such, and additionally in order to prevent that during the normal processing of the plastic material exceedingly large volumes are pumped back via the flushing line into the vessel, requiring an unnecessarily high pump output, it is furthermore recommended to construct the valve for the control of the back flow in such a manner that in addition to its first position of maximal opening for a maximal return flow via the flushing line at least one secondary position of lesser opening is available, the valve still, however, not being completely closed. By means of the slightly open valve during normal processing a sufficient plastic stream can back-flow through the flushing line, while otherwise, when the valve is completely open, a relatively large plastic material valumes can be pumped back. Thus, no undesirably large pressure can build up on the discharge side of the pump when the closing member is closed.

In a preferred embodiment of the inventive apparatus the closing member is a plate slidably attached to or within the housing and immediately adjacent to the die head. Several flushing lines are connected upstream of this plate alongside the edge of the first outlet. The plate therefore can take the place of a filter or of a die head with an integral filter, having the advantage that indeed the entire apparatus is flushed up to the components to be exchanged. Furthermore, by the multitude of flushing lines no dead zones can form, even in the area of the plate, in which the molten plastic material can remain for an undesirably long period of time.

The above indicates that this variation of the invention is particularly suitable for combination with an exchangeable die head in which the filter is integrally installed; during the exchange of such so called die-filter the plate need merely be installed in its place. Such a die-filter has already been suggested by the applicant in his patent application Ser. No. 493,261.

It is desirable for several reasons not to have to follow each container, for example each polymerization vessel, with its own processing apparatus, as such is not only extremely expensive, but also requires that at each conclusion of the processing phase of a batch the entire process is interrupted. The connection of several vessels to one singular processing apparatus had the disadvantage, however, of the required long pipe sections, all of which must be heated so that the plastic in those lines which lead to not then operational vessels are subjected to the danger of thermal damage. The inventive concept here suggests to provide the inventive apparatus with several inlets to be connected to outlets of several vessels containing the molten plastic material to be processed; further, several second outlets should be provided connecting to the back-flow lines of the vessels, as well as a multiple way valve for the selective connecting of the flushing line with one of the back flow lines. Additionally, for each inlet a switch valve should be provided in order to distribute the flow either to the first outlet (processing outlet) or to the second outlet associated with this inlet. It is thus possible to operate continuously. Plastic material is continually pumped even from vessels not then connected to the processing outlet through the switch valve and associated back-flow line back into the vessel, thereby constantly flushing all lines and ports. The switch valve is preferably built such that it opens in its every position the connection between the switch valve and the associated second outlet, so that this duct is flushed even when the plastic material from the associated container is just being processed. In order on the other hand to prevent that too much plastic material flows back into the container via this channel during the normal processing, it is recommended to provide upstream of the multiple way valve a choke valve between each switch valve and associated second outlet such choke valve to be adjustable at least from an open position to a choke position in which it is not quite closed. Thereby it is guaranteed that sufficient quantities of plastic material flow through the duct between the switch valve and the second outlet in order to continuously flush it, even when the vessel is connected to the processing outlet.

Finally it is recommended to provide a filtering mechanism in the return line, so that the plastic material is continuously filtered, but without interrupting the back flow during a screen change. Filtering devices of that type are known from German published patent application No. 1,729,193.

Further characteristics advantages and details of the invention are contained in the attached claims and/or the drawings and/or the following description of the preferred embodiments of the inventive apparatuses represented in the drawings; there is shown in:

FIG. 1 is a schematical representation of an apparatus with the inventive apparatus connected only to one singular vessel; and FIG. 2 a schematical representation of another embodiment of the inventive apparatus in which it is connected to two containers.

DESCRIPTION OF THE PREFERRED EMBODIMENTS

FIG. 1 shows a polymerization vessel 10, onto which lower end is connected a nipple 12 forming an outlet, and which additionally is provided with a measuring device 14 to monitor the level of the plastic melt within the polymerization vessel. An outlet valve 16 and a melt pump 18 are connected to nipple 12.

The pump transfers the plastic melt through feed line 20 into the inventive apparatus. Said apparatus basically consists of a housing 22 and a choke valve designated as a whole by 24. Housing 22 contains an inlet 26 to which is connected feed-line 20, as well as main supplyline 30, widening in the direction of outlet 28. At the lower side of housing 22 guide rails 32 are installed onto which components to be slid in front of outlet 28 are positioned. FIG. 1 further shows a so called die-filter, indicated as a whole by 34, as well as a closing plate 36; said figure further reveals that the die-filter consists of a filter plate 34a and a die body 34b containing bores 34c for the pressing out of plastic strands. Die-filter 34 may just as well be, for example, a wide slit die for the extrusion of foils. For the movement of closing plate 36 and die-filter 34 on the guide rails 32 a hydraulic cylinder 38 is provided.

Several flushing ports 40 ending immediately at outlet 28 are machined into housing 22. Outlet pipes 42 lead from the other end of the flushing parts to choke valve 24, which in turn is connected with the polymerization vessel 10 via back flow line 44. A valve member 24a of choke valve 24 is adjustable by means of a further hydraulic cylinder 46 between a first position indicated in FIG. 1, in which the choke valve 24 is entirely opened, and an advanced second position, in which the choke valve has a drastically reduced throughput cross sectional area, but is not completely closed.

Finally, in the path of back-flow line 44 a filter indicated as a whole as 50 is provided which serves to filter the liquid plastic material prior to again reaching the polymerization vessel 10.

The entire polymerization vessel 10 as well as all lines, bores, and ports of the apparatus shown in FIG. 1 are continuously heated, for example electrically or by means of hot medium circulation, in order to always maintain the plastic material to be processed through the apparatus in liquid form. The die filters are of course heated in similar fashion. Since the invention is, however, not concerned with the heating, the therefor required components have been omitted in the drawing.

If in the apparatus shown die filter 34 is to be changed because there had been too much deposition on its filter plate 34a, the die filter to be exchanged is pushed away from under the housing 22 by means of the hydraulic cylinder 38, and in its place the closing plate 36 is emplaced over the outlet 28. At the same time choke valve 24 is opened (to the position indicated in FIG. 1) so that pump 18 may continue pumping at full capacity, since then the plastic material pumped into housing 22 can flow back into the polymerization vessel 10 via flushing